United States Patent
Biegert et al.

(10) Patent No.: US 10,956,662 B2
(45) Date of Patent: *Mar. 23, 2021

(54) LIST MANIPULATION IN NATURAL LANGUAGE PROCESSING

(71) Applicant: International Business Machines Corporation, Armonk, NY (US)

(72) Inventors: Keith P. Biegert, Cary, NC (US); Brendan C. Bull, Durham, NC (US); David Contreras, Willow Spring, NC (US); Robert C. Sizemore, Fuquay-Varina, NC (US); Sterling R. Smith, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/128,552

(22) Filed: Sep. 12, 2018

(65) Prior Publication Data

US 2019/0026259 A1 Jan. 24, 2019

Related U.S. Application Data

(63) Continuation of application No. 15/000,114, filed on Jan. 19, 2016, now Pat. No. 10,140,273.

(51) Int. Cl.
*G06F 17/24* (2006.01)
*G06F 40/169* (2020.01)
*G06F 40/30* (2020.01)
*G06F 40/284* (2020.01)

(52) U.S. Cl.
CPC .......... *G06F 40/169* (2020.01); *G06F 40/284* (2020.01); *G06F 40/30* (2020.01)

(58) Field of Classification Search
CPC ....... G06F 40/169; G06F 40/30; G06F 40/284
See application file for complete search history.

(56) References Cited

U.S. PATENT DOCUMENTS

| 5,418,717 A | 5/1995 | Su et al. |
| 5,926,811 A | 7/1999 | Miller et al. |
| 6,101,492 A | 8/2000 | Jacquemin et al. |

(Continued)

FOREIGN PATENT DOCUMENTS

| WO | 2010132790 A1 | 11/2010 |
| WO | 2013088287 A1 | 6/2013 |

OTHER PUBLICATIONS

Jung "Three Essays on Enhancing Clinical Trial Subject Recruitment Using Natural Language Processing and Text Mining", Aug. 2015, pp. 1-177. (Year: 2015).*

(Continued)

*Primary Examiner* — Stephen S Hong
*Assistant Examiner* — Ahamed I Nazar
(74) *Attorney, Agent, or Firm* — Stosch Sabo

(57) ABSTRACT

First content containing a plurality of list items in one or more lists can be parsed for conjunctions and implied list indicators. One or more modifications can occur at one or more conjunctions or implied list indicators. The one or more modifications can comprise one or more of expanding text, contracting text, and replacing text. The one or more modifications can generate second content conducive to natural language processing operations.

20 Claims, 7 Drawing Sheets

(56) References Cited

U.S. PATENT DOCUMENTS

| | | | |
|---|---|---|---|
| 6,269,368 B1* | 7/2001 | Diamond | G06F 16/3329 |
| 7,797,152 B1* | 9/2010 | Waite | G06F 16/3344 |
| | | | 704/9 |
| 7,797,303 B2 | 9/2010 | Roulland et al. | |
| 7,930,302 B2 | 4/2011 | Bandaru et al. | |
| 8,095,530 B1* | 1/2012 | Lloyd | G06F 7/02 |
| | | | 707/709 |
| 8,892,550 B2 | 11/2014 | Chu-Carroll et al. | |
| 9,588,950 B2 | 3/2017 | Kramer et al. | |
| 9,747,390 B2 | 8/2017 | Cooper et al. | |
| 2005/0055200 A1* | 3/2005 | Park | G06F 40/268 |
| | | | 704/4 |
| 2005/0097628 A1 | 5/2005 | Lussier et al. | |
| 2007/0005621 A1 | 1/2007 | Lesh et al. | |
| 2007/0283000 A1* | 12/2007 | Proux | H04L 51/12 |
| | | | 709/224 |
| 2008/0228769 A1 | 9/2008 | Lita et al. | |
| 2009/0234683 A1* | 9/2009 | Anderson | G06Q 20/10 |
| | | | 705/38 |
| 2012/0290288 A1* | 11/2012 | Ait-Mokhtar | G06F 40/211 |
| | | | 704/9 |
| 2013/0041921 A1 | 2/2013 | Cooper et al. | |
| 2013/0138425 A1 | 5/2013 | Luke | |
| 2014/0149407 A1 | 5/2014 | Qian et al. | |
| 2014/0236579 A1 | 8/2014 | Kurz | |
| 2014/0280207 A1 | 9/2014 | Renders et al. | |
| 2015/0235130 A1 | 8/2015 | Contreras et al. | |
| 2015/0379241 A1 | 12/2015 | Furst et al. | |
| 2016/0098394 A1 | 4/2016 | Bruno et al. | |
| 2017/0060831 A1 | 3/2017 | Smythe et al. | |
| 2017/0103329 A1* | 4/2017 | Reddy | G06Q 30/016 |
| 2017/0206191 A1 | 7/2017 | Biegert et al. | |

OTHER PUBLICATIONS

Jung (Three Essays on Enhancing Clinical Trial Subject Recruitment Using Natural Language Processing and Text Mining, pub. Aug. 2015, pp. 1-177) (Year: 2015).*

IBM, "IBM Watson for Clinical Trial Matching", http://www.ibm.com/smarterplanet/us/en/ibmwatson/clinical-trial-matching.html. Last printed Feb. 15, 2016. 3 pages.

Widdows et al., "A Graph Model for Unsupervised Lexical Acquisition", published Aug. 24, 2002 by Association of Computational Linguistics, vol. 1, pp. 1-7.

Ait-Mokhtar et al., "Linguistic parsing of lists in structured documents", 2003, located at www.SemanticScholar.org, pp. 1-8.

Jung, E., "Three Essays on Enhancing Clinical Trial Subject Recruitment Using Natural Language Processing and Text Mining", Aug. 2015, University of Wisconsin Madison Digital Commons, pp. 1-177.

IBM, List of IBM Patents or Patent Applications Treated as Related, Sep. 11, 2018, 2 pages.

* cited by examiner

US 10,956,662 B2

LIST MANIPULATION IN NATURAL LANGUAGE PROCESSING

BACKGROUND

The present disclosure relates to natural language processing (NLP), and more specifically, to expanding and/or contracting text associated with lists.

Lists can provide a simplified textual representation of a plurality of related items. In some cases, a list can use implied text rather than explicit text to simplify the list. Implied text can be imprecisely ingested during NLP operations. Imprecise NLP ingestion can result in imprecise output during question and answer (Q&A) processing.

SUMMARY

Aspects of the present disclosure are directed to a method that can comprise receiving input text comprising one or more lists, where each list comprises a plurality of list items. The method can further comprise segmenting input text into tokens and annotating the tokens for parts of speech by identifying one or more conjunctions or terms indicating the one or more lists and by identifying the plurality of respective list items based on the one or more conjunctions. The method can further comprise retrieving a list modification rule set based on the input text and modifying the one or more lists based on the list modification rule set to generate modified input text. The method can further comprise storing the modified input text.

Aspects of the present disclosure are further directed to a system comprising a computer readable storage medium storing a corpus of data, a user interface configured to receive input and present output, and a processor communicatively coupled to the computer readable storage medium and the user interface and having a memory comprising instructions. The instructions can be configured to cause the processor to receive a first content from the user interface and identify one or more list items within the first content, where each list item is associated with a list. To identify one or more list items the processor can be further configured to segment the first content into tokens, annotate the first content for conjunctions, and identify each respective list item based on implied list indicators or tokens annotated as conjunctions. The instructions can be further configured to cause the processor to modify one or more list items in the first content to create a second content, where modifying one or more list items is based on a list modification rule set associated with the first content and retrieved from the computer readable storage medium. The instructions can be further configured to match the second content to one or more portions of data in the corpus of data, score each respective match, and present one or more matched portions of data to the user interface.

Aspects of the present disclosure are further directed to a computer program product comprising a computer readable storage medium having program instructions executable by a processor. The program instructions can cause the processor to receive first input comprising a plurality of list items compiled in one or more lists and segment the first input into tokens. The program instructions can further cause the processor to parse the first input for parts of speech (POS) by parsing the first input for list item separators, where list item separators can comprise at least one of conjunctions or implied list indicators, and by identifying respective list items of the plurality of list items based on respective list item separators. The program instructions can be further configured to cause the processor to retrieve a list modification rule set based on the first input and create a second input based on the first input and the list modification rule set. In embodiments, the second input can comprise one or more modifications occurring at one or more list item separators. The program instructions can further cause the processor to store the second input.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
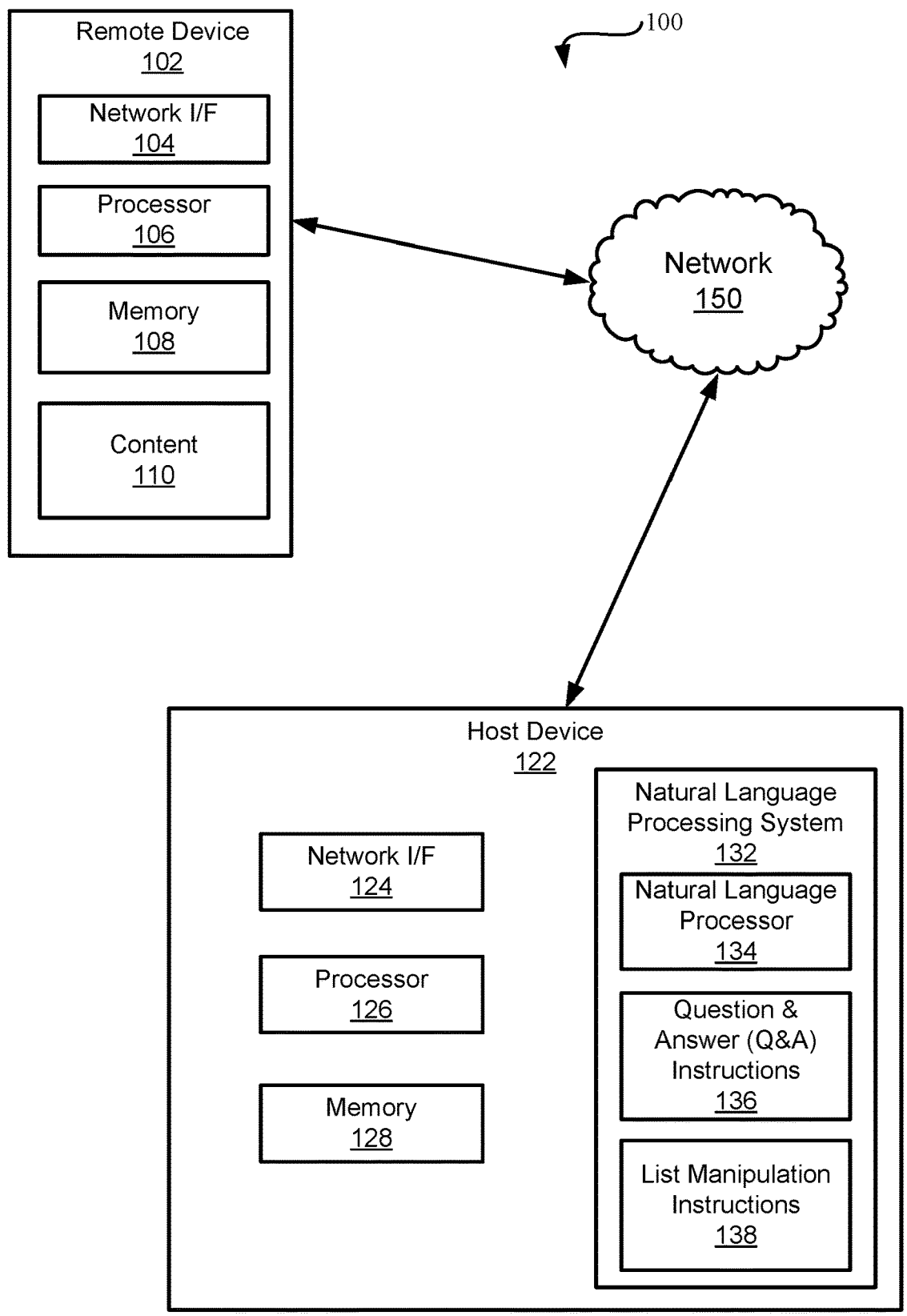
FIG. 1 depicts a block diagram of an example computing environment in which embodiments of the present disclosure may be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to natural language processing (NLP). More particular aspects relate to expanding and contracting text associated with lists. Although not limited to such applications, an understanding of some embodiments of the present disclosure may be improved given the context of NLP.

Aspects of the present disclosure relate to NLP and Question and Answer (Q&A) systems. Q&A systems can be configured to, for example, conduct searches, mine data, match terms, match concepts, and other operations useful for determining one or more relationships between data. Q&A systems can benefit from consistent text formatting to match input to relevant data (e.g., a question to an answer). Aspects of the present disclosure relate to formatting lists to a form conducive to NLP and Q&A systems. For example, in embodiments, the phrase "stage I, II, and III cancer" can be formatted to a form conducive to NLP and Q&A systems such as "stage I cancer, stage II cancer, and stage III cancer."

Some embodiments of the present disclosure relate to clinical trial matching. Clinical trial matching identifies patients eligible for various clinical trials based on patient characteristics such as, but not limited to, age, gender, medical history, and so on. Thus, in embodiments, one or more patient profiles (e.g., a database of patient profiles) can be compared to one or more clinical trial profiles (e.g., a database of clinical trial profiles) to determine suitable patient-clinical trial matches.

Referring now to the figures, FIG. 1 depicts a block diagram of an example computing environment 100 in which embodiments of the present disclosure can be implemented. In embodiments, the computing environment 100 can include a remote device 102 and a host device 122.

According to embodiments, the host device 122 and the remote device 102 can be computer systems. The remote device 102 and the host device 122 can include one or more processors 106 and 126 and one or more memories 108 and 128, respectively. The remote device 102 and the host device 122 can be configured to communicate with each other through an internal or external network interface 104 and 124 (e.g., modems or interface cards). The remote device 102 and/or the host device 122 can be equipped with a display or monitor. Additionally, the remote device 102 and/or the host device 122 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote device 102 and/or the host device 122 can be servers, desktops, laptops, or hand-held devices.

The remote device 102 and the host device 122 can be distant from each other and can communicate over a network 150. In embodiments, the host device 122 can be a central hub from which a remote device 102 and other remote devices (not pictured) can establish a communication connection, such as in a client-server networking model. In some embodiments, the host device 122 and remote device 102 can be configured in any other suitable network relationship (e.g., in a peer-to-peer configuration or using another network topology).

In embodiments, the network 150 can be implemented using any number of any suitable communications media. For example, the network 150 can be a wide area network (WAN), a local area network (LAN), the Internet, or an intranet. In certain embodiments, the remote device 102 and the host device 122 can be local to each other, and communicate via any appropriate local communication medium. For example, the remote device 102 and the host device 122 can communicate using a local area network (LAN), one or more hardwire connections, a wireless link or router, or an intranet. In some embodiments, the remote device 102, the host device 122, and any other devices can be communicatively coupled using a combination of one or more networks and/or one or more local connections. For example, the remote device 102 can be hardwired to the host device 122 (e.g., connected with an Ethernet cable) while a second device (not pictured) can communicate with the host device using the network 150 (e.g., over the Internet).

In some embodiments, the network 150 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

In some embodiments, the remote device 102 can enable users to submit (or can submit automatically with or without a user selection) questions, criteria, and/or data sources containing one or more explicit or implied lists to the host device 122. In some embodiments, the host device 122 can include a natural language processing system 132. The natural language processing system 132 can include a natural language processor 134, Q&A instructions 136, and list manipulation instructions 138. The natural language processor 134 can include numerous subcomponents, such as a tokenizer, a part-of-speech (POS) tagger, a semantic relationship identifier, and a syntactic relationship identifier. An example natural language processor is discussed in more detail in reference to FIG. 2. The natural language processor 134 can be configured to perform natural language processing to ingest content 110 from remote device 102. In various embodiments, content 110 can comprise a question, a search term or phrase, a set of data (e.g., a user profile or a clinical trial profile), or a corpus of data (e.g., a set of documents related to a topic, or a database of patient profiles, etc.).

In some embodiments, the list manipulation instructions 138 can be configured to identify explicit lists, implied lists, and/or extraneous text in content 110. For the purposes of the present disclosure, an explicit list is to be construed to mean a list containing one or more conjunctions (e.g., "and", "or", or a comma) separating the recitation of two or more list items. For example, an explicit list could comprise the phrase "patients having non-small cell, squamous, adenocarcinoma, or large cell lung cancers" where the phrase contains four conjunctions (three commas and "or") that indicate a list. Explicit lists are described in greater detail hereinafter with respect to FIG. 7.

For the purposes of the present disclosure, the term "implied list" is to be construed to mean a phrase or term, which, in and of itself, is not grammatically a list but that can be accurately articulated as a list. For example, the phrase "non-small cell lung cancer (NSCLC)" can be explicitly articulated as "non-small cell lung cancer, squamous lung cancer, adenocarcinoma lung cancer, and large cell lung cancer." Thus, although NSCLC does not contain a conjunction, it can nonetheless be accurately represented by an explicit list. Implied lists are described in more detail hereinafter with respect to FIG. 5.

For the purposes of the present disclosure, the term "extraneous text" is to be construed to mean text which does not clarify the meaning of a phrase or statement given the context of the statement for the purposes of NLP and/or Q&A systems. For example, a clinical trial related to breast cancer can contain the statement "previous hormonal breast cancer therapy patients are excluded from this study." If this clinical trial is compared to a database of breast cancer patients, then the term "breast cancer" can be considered extraneous. In such a case, the statement can be modified to remove the extraneous text and recite "previous hormonal therapy patients are excluded from this study." Thus, the extraneous terms have been removed and the phrase is in a form conducive to ingestion and matching in, for example, a Q&A system such as a system matching patients to clinical trials. Extraneous text is described in further detail hereinafter with respect to FIG. 6.

The Q&A instructions 136 can be configured to analyze content in light of a set of data to determine an answer, a match, or a different output based on the content and the set of data. The Q&A instructions 136 can be executed by one or more processors (e.g., natural language processor 134) and can utilize information received from the execution of the list manipulation instructions 138 to perform its functions.

While FIG. 1 illustrates a computing environment 100 with a single host device 122 and a single remote device 102, suitable computing environments for implementing embodiments of this disclosure can include any number of remote devices and host devices. The various models, modules, systems, instructions, and components illustrated in FIG. 1 can exist, if at all, across a plurality of host devices and remote devices.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

Figure 2:
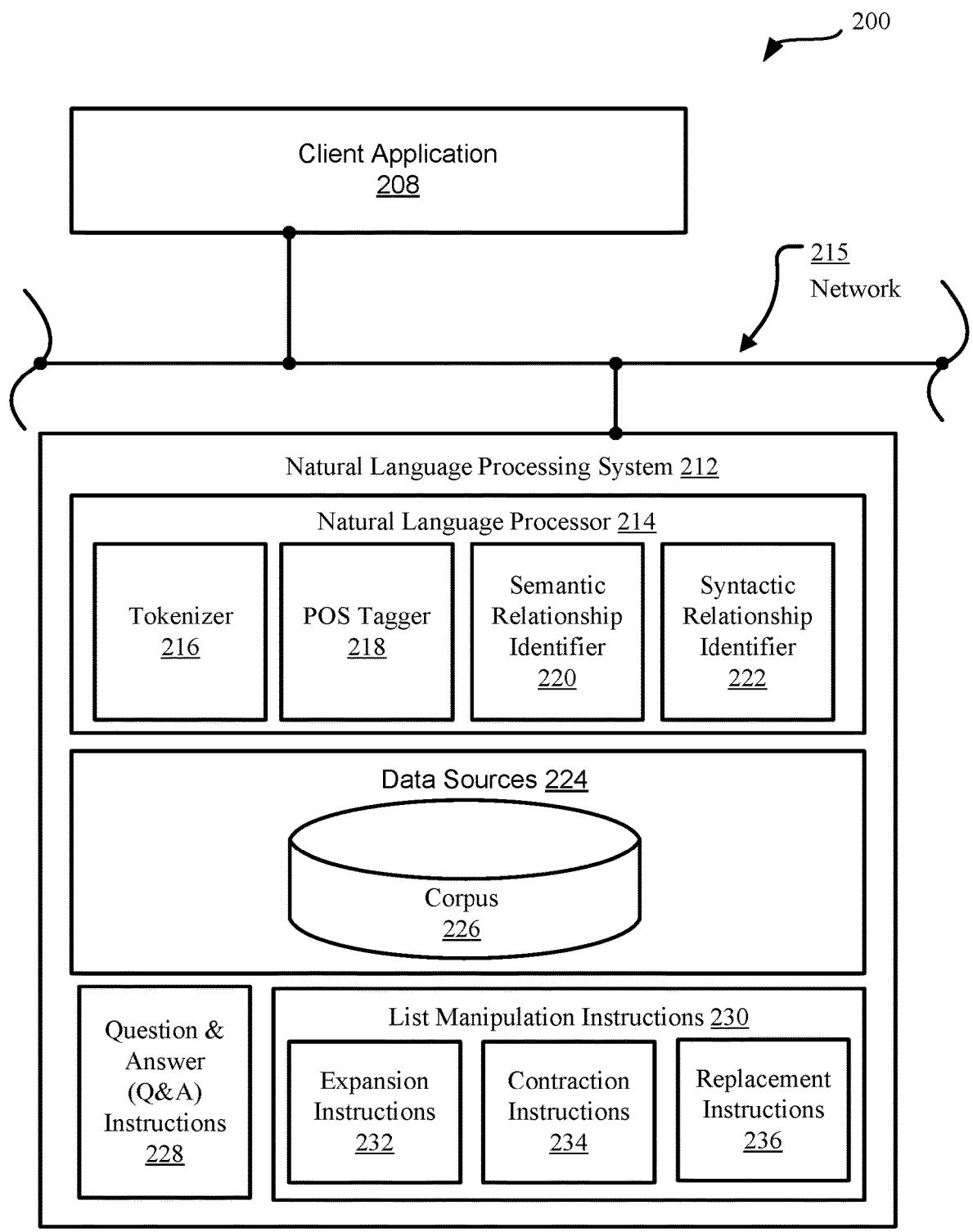
FIG. 2 depicts a block diagram of an example system architecture, including a natural language processing system, configured to modify lists in ingested content according to some embodiments of the present disclosure.

FIG. 2 depicts a block diagram of an example system architecture 200, including natural language processing system 212, configured to modify lists contained in ingested content, according to embodiments. In embodiments, a remote device (such as remote device 102 of FIG. 1) can submit content (e.g., questions, criteria, profiles, or other sets of data containing explicit or implied lists) to be analyzed by the natural language processing system 212 which can be housed on a host device (such as host device 122 of FIG. 1). A remote device (e.g., remote device 102 of FIG. 1) can include a client application 208, which can itself involve one or more entities operable to modify lists that can be dispatched to a natural language processing system 212 via a network 215.

In embodiments, the natural language processing system 212 can respond to content submissions sent by a client application 208. Specifically, the natural language processing system 212 can analyze content or other data to identify and manipulate one or more explicit or implied lists in order to clarify the meaning of the one or more explicit or implied lists to improve, for example, Q&A operations.

In some embodiments, the natural language processing system 212 can include a natural language processor 214, data sources 224, Q&A instructions 228, and list manipulation instructions 230. The natural language processor 214 can be configured to analyze the received content by performing various methods and techniques according to various sets of processor-executable instructions. These sets of processor-executable instructions can include, but are not limited to, a tokenizer 216, a part-of-speech (POS) tagger 218, a semantic relationship identifier 220, and a syntactic relationship identifier 222. Further, the natural language processor 214 can be configured to recognize and analyze any number of natural languages. In some embodiments, the natural language processor 214 can parse passages of the received content.

In some embodiments, the tokenizer 216 can be a computer module (or a set of instructions executable by the natural language processor 214) that performs lexical analysis. The tokenizer 216 can convert a sequence of characters into a sequence of tokens. A token can be a string of characters included in a written passage and categorized as a meaningful symbol. Further, in some embodiments, the tokenizer 216 can identify word boundaries in content and break any text passages within the content into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module (or a set of instructions executable by the natural language processor 214) that marks up a word in passages to correspond to a particular part of speech. The POS tagger 218 can read a passage or other text in natural language and assign a part of speech to each word or each token. The POS tagger 218 can determine the part of speech to which a word (or other text element) corresponds based on the definition of the word and the context of the word. The context of a word can be based on its relationship with adjacent and related words in a phrase, sentence, or paragraph. In some embodiments, the context of a word can be dependent on previously analyzed content (e.g., content of a first question can shed light on meaning of text elements of a second, follow-up question). Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In embodiments, the semantic relationship identifier 220 can be a computer module (or a set of instructions executable by the natural language processor 214) that can be configured to identify semantic relationships of recognized text elements (e.g., words, phrases) in received content. In some embodiments, the semantic relationship identifier 220 can determine functional dependencies between entities and other semantic relationships.

In embodiments, the syntactic relationship identifier 222 can be a computer module (or a set of instructions executable by the natural language processor 214) that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can be a computer module that can parse received content and generate corresponding data structures for one or more portions of the received content. For example, in response to receiving a repository of documents at the natural language processing system 212, the natural language processor 214 can output parsed text elements from the documents as data structures. In some embodiments, a parsed text element can be represented in the form of a parse tree or other graph structure. To generate the parsed text element, the natural language processor 214 can execute the instructions contained in 216-222.

In some embodiments, the output of natural language processor 214 (e.g., ingested content) can be stored within data sources 224, such as corpus 226. As used herein, a corpus can refer to one or more discrete data sets (e.g., a relational database, a textbook, a website, or a plurality of data sets sharing similar content, such as, for example, a plurality of databases, websites, and documents regarding cancer). In some embodiments, the data sources 224 can include data warehouses, corpora, data models, and document repositories.

In embodiments, the list manipulation instructions 230 can search data sources 224 including the corpus 226 of ingested data for explicit lists or implied lists. Likewise, the list manipulation instructions 230 can search questions, statements, or other data sources received from a client application 208 for explicit lists or implied lists. In embodiments, the list manipulation instructions 230 can generate modified content placing explicit and/or implied lists in a form conducive to, for example, Q&A processing.

In some embodiments, the list manipulation instructions 230 can include expansion instructions 232, contraction instructions 234, and replacement instructions 236. The expansion instructions 232 can provide processor-executable instructions to expand an explicit or implied list as described in further detail hereinafter with respect to FIG. 7.

In some embodiments, the list manipulation instructions can further include processor-executable contraction instructions 234. Contraction instructions 234 can be used to remove extraneous information associated with a list. Contraction instructions 234 are described in further detail hereinafter with respect to FIG. 6.

In some embodiments, the list manipulation instructions 230 can include processor-executable replacement instructions 236. Replacement instructions 236 can identify an implied list and replace the implied list with an explicit list in accordance with some embodiments. The replacement instructions 236 are described in further detail hereinafter with respect to FIG. 5.

Figure 3:
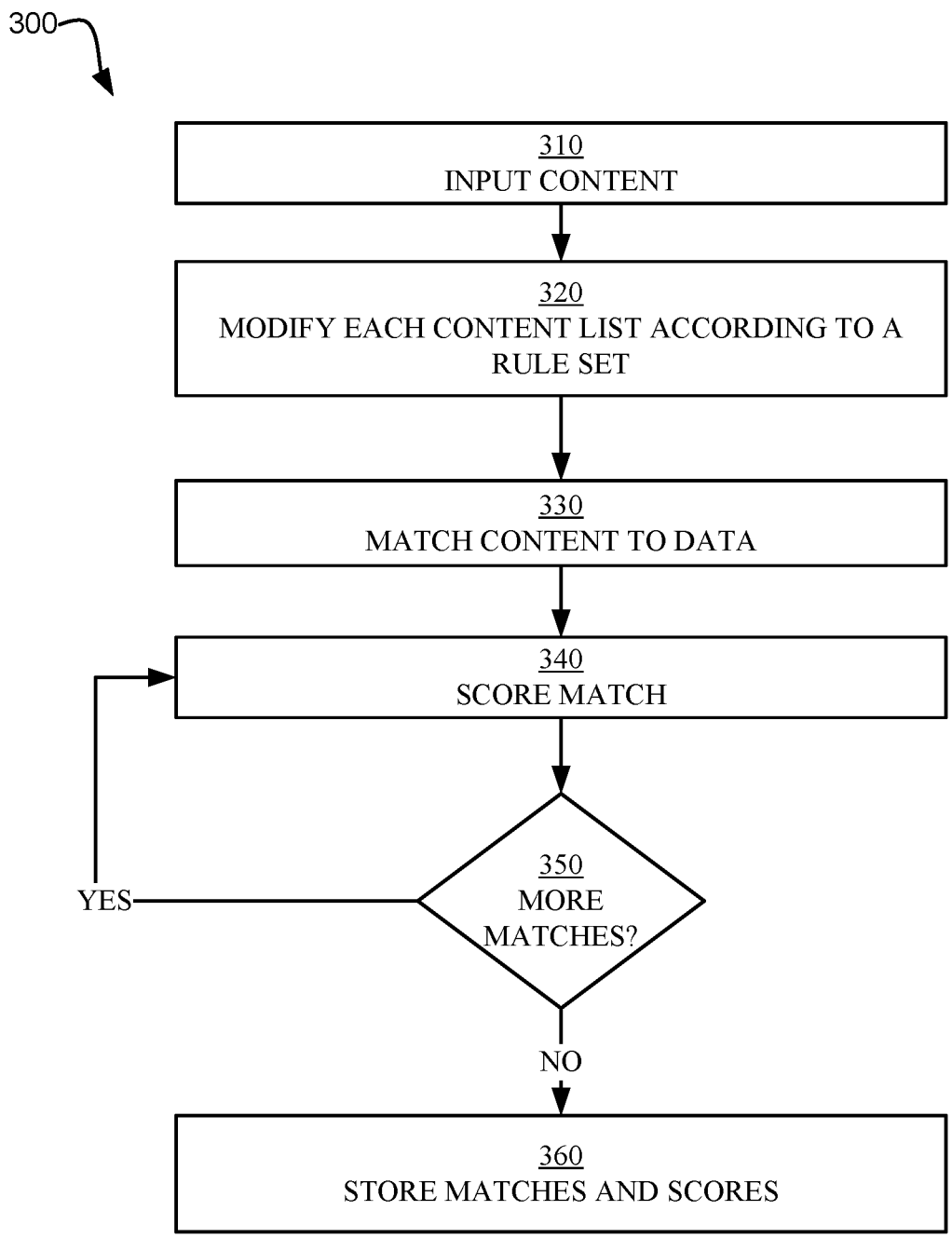
FIG. 3 illustrates a flowchart of an example method for modifying a list and matching the list to content in a corpus of data in accordance with some embodiments of the present disclosure.

FIG. 3 illustrates a flowchart of an example method 300 for modifying a list and matching said list to data in accordance with some embodiments of the present disclosure. In some embodiments, the method 300 can be implemented by a processor (e.g., processor 126 of FIG. 1 or 214 of FIG. 2) based on a set of instructions (e.g., Q&A instructions 136 and list manipulation instructions 138 of FIG. 1 or Q&A instructions 228 and list manipulation instructions 230 of FIG. 2).

The method 300 can begin with operation 310 with the input of content. In various embodiments, the content can comprise text in the form of a question, a document, a website, or a set of text (e.g., a user profile or a clinical trial criteria). In some embodiments, the content is input by a user to a remote device (e.g., remote device 102 of FIG. 1) or to a host device (e.g., host device 122 of FIG. 1).

In operation 320, one or more lists can be identified and modified in the content. The one or more lists can be identified by list item separators (e.g., conjunctions) or by other indicators. The one or more lists can be modified to expand, contract, or replace one or more respective lists according to a set of rules. Operation 320 is described in further detail hereinafter with respect to FIG. 4.

In operation 330, the modified content can be matched to a portion of data. The data can comprise a corpus or corpora of data contained in numerous forms (e.g., documents, databases, websites, etc.). The matching can be based on semantic characteristics, syntactic characteristics, other characteristics, or a combination of the aforementioned characteristics.

In some embodiments, matches are found by generating a content parse tree and one or more data parse trees related to the corpus or corpora of data. The content parse tree can be compared to various portions of the data parse tree to find one or more subtrees of the data parse tree that are identical or similar to the content parse tree. In some embodiments, the parse trees can be generated by the natural language processor 214 of FIG. 2.

In operation 340, the match between the content and the data can be scored. The score can indicate the syntactic similarity, the semantic similarity, both the syntactic similarity and the semantic similarity, or other measures indicating an accuracy of each respective match. Although not shown, in some embodiments the score is compared to a score threshold. Matches having scores above the score threshold can be stored while matches having scores below the score threshold can be discarded. In some embodiments where a plurality of matches are scored and stored, the matches can be ranked based on the scores. In alternative embodiments, scores can comprise pass/fail scores such as "eligible" and "not eligible" scores.

In operation 350, it can be determined if there are more matches. If there are more matches, the method 300 returns to operation 340 and scores the match. If there are no more matches, the method 300 can continue to operation 360.

In operation 360, the matched data and scores can be stored. The matched data and scores can be stored in a computer readable storage medium which can be located on a remote device (e.g., memory 108 of remote device 102 of FIG. 1), a host device (e.g., memory 128 of host device 122 of FIG. 1), or a different device accessible over a network (e.g., network 150 of FIG. 1). In some embodiments, the matched data can be output to a user interface.

Thus, the method 300 illustrates an example method of processing content in a Q&A system. The method can include inputting content containing one or more lists, modifying the one or more lists to a form conducive to Q&A processing, matching the modified content to one or more sets of data in a corpus of data, scoring each match, and storing one or more matches.

Figure 4:
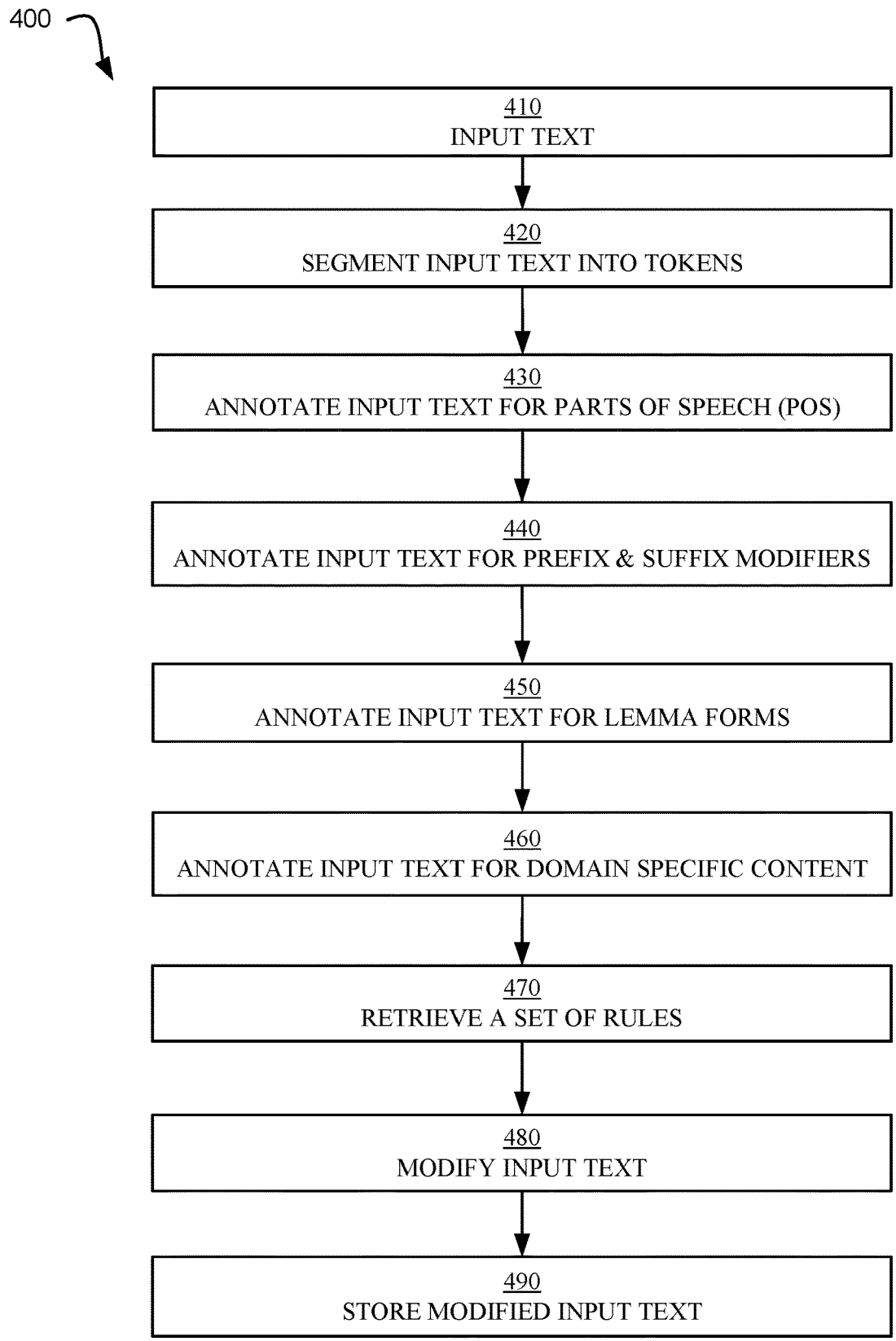
FIG. 4 illustrates an example method for modifying a list in accordance with some embodiments of the present disclosure.

FIG. 4 illustrates an example method 400 of manipulating text in accordance with some embodiments of the present disclosure. In various embodiments, the method 400 can be implemented by one or more processors (e.g., processor 126 of FIG. 1 or 214 of FIG. 2) according to a set of instructions (e.g., list manipulation instructions 138 of FIG. 1 or list manipulation instructions 230 of FIG. 2). In some embodiments, the method 400 is a submethod of operation 320 of FIG. 3.

The method 400 can begin with text input in operation 410. The text can comprise a question, a document, a website, a profile, or a different set of text data. In some embodiments, the input text can be based on user input to a user interface. In some embodiments, the input text can be the same or substantially the same as content 110 of FIG. 1.

In operation 420, the input text can be segmented into tokens. Tokens can comprise portions of text useful for lexical analysis. For example, tokens can comprise words, punctuation marks, and other portions of text. Operation 420 can be performed by, for example, tokenizer 216 of FIG. 2.

In operation 430, the input text can be annotated for parts of speech (POS). Parts of speech can include, but are not limited to, nouns, pronouns, verbs, adjectives, adverbs, comparative or superlative adverbs, wh-adverbs, conjunctions, determiners, negative particles, possessive markers, prepositions, wh-pronouns, and the like. Operation 430 can further comprise identifying list items based on the location of conjunctions (also referred to as list item separators herein). For the purposes of the present disclosure, conjunctions can include, but are not limited to, word conjunctions (e.g., and, or) and punctuation conjunctions (e.g., commas).

Operation 430 can identify respective lists and respective list items based on the number and type of conjunctions in numerous ways. For example, in the phrase "stage I, II, and III cancer," operation 430 can identify the two commas and the word "and" as list item separators. In embodiments, conditional logic can be associated with the identification of list item separators. For example, in cases where a punctuation conjunction is located adjacent to a word conjunction, operation 430 can group the two conjunctions as a single conjunction. Thus, considering again the example phrase "stage I, II, and III cancer," operation 430 can identify the two adjacent conjunctions ", and" as a single conjunction. Further still, conditional logic can determine cases where a conjunction indicates a list and where a conjunction performs a different grammatical function. For example, the dash in "stage I-III cancer" indicates a list whereas the dash in "non-small cell lung cancer" does not indicate a list. In some embodiments, operation 430 can generate a parse tree to define the grammatical purpose of textual elements in a set of text. Operation 430 can be performed by, for example, POS tagger 218 of FIG. 2.

In operation 440, the input text can be annotated for prefix and suffix modifiers. Prefix modifiers can comprise a word or phrase appearing before (explicitly or impliedly) each list item. Suffix modifiers can comprise a word or phrase appearing after (explicitly or impliedly) each list item. For example, the phrase "stage I, II, and III cancer" contains prefix modifier "stage" and suffix modifier "cancer." The term "stage" is an explicit prefix to "I" and an implied prefix to "II" and "III." Likewise, "cancer" is an explicit suffix to "III" and an implied suffix to "I" and "II."

In operation 450, the input text can be annotated for lemma forms of at least a portion of the input text. A lemma form of a word can comprise a headword representing numerous forms of a word having similar meaning. For example, the words "run," "runs," "ran," and "running" can be annotated with the lemma form "run." Thus, lemma forms can simplify words in a set of text by annotating one or more words to a form irrelevant of tense, plurality, or other grammatical variations. These lemma forms can promote efficient analysis of words and phrases (e.g., lemma forms can simplify domain specific content rules and annotations).

In some embodiments, lemma forms can comprise triggers and scopes. For example, the phrases "brain cancer patients," "patients having cancers associated with the brain," and "patients having cancerous brain tumors" can be simplified using lemma forms, triggers, and scopes. In the three phrases, "cancer," "cancers," and "cancerous" can be reduced to the lemma form "cancer." "Cancer" can be a trigger word. The trigger word can be associated with one or more scopes which limit the meaning of the trigger. In the three examples, "brain" can be the scope of the trigger "cancer."

In operation 460, the input text can be annotated for domain specific content. Domain specific content annotations can comprise annotations indicating particular interpretations of one or more words given the context of the input text. For example, a "medical" domain specific annotation can be applied to the term "stage" in the phrase "stage III cancer" to differentiate the term from other meanings (e.g., a theater stage). In some embodiments, numerous domain specific content annotations are associated with one or more words of the input text. In alternative embodiments, the most precise domain specific annotation is associated with one or more words of the input text. For example, a term can receive both a "medical" and a "cancer" domain specific annotation, or, the term can receive a "cancer" domain specific annotation since "cancer" is a subdomain of "medical" according to various embodiments. Operation 460 can, in some embodiments, use any or all information from operations 410-450 in identifying and annotating domain specific content to one or more textual elements of the input text.

In operation 470, a set of list modification rules can be retrieved. The set of list modification rules can be retrieved based on, alone or in combination, the domain specific content of the input text, the number and type of list item separators, the number and type of parts of speech, the number and type of prefix and suffix modifiers, the lemma forms of various words of the input text, and/or triggers and scopes of the input text. The list modification rule set can contain information regarding list modifications such as, but not limited to, when and how to expand lists, when and how to contract lists, and when and how to replace lists.

In operation 480, the input text can be modified based on the set of rules retrieved in operation 470 in light of the annotations applied in operations 430-460. The modified input text can comprise one or more expansions, one or more contractions, and/or one or more replacements to portions of the input text. Operation 480 is described in further detail hereinafter with respect to FIGS. 5, 6, and 7.

In operation 490, the modified input text can be stored. The modified input text can be stored in a computer readable storage medium on a remote device (e.g., memory 108 of remote device 102 of FIG. 1), on a memory of a host device (e.g., memory 128 of host device 122), or on a different memory accessible via a network (e.g., network 150 of FIG. 1). In some embodiments, the modified input text can be output to a user interface.

Thus, the method 400 illustrates an example method of modifying a set of text to make the text conducive to, for example, Q&A systems. The method 400 can include annotating portions of the text, retrieving a rule set applicable to the text, modifying the text in accordance with the rule set, and storing the modified text.

Figure 5:
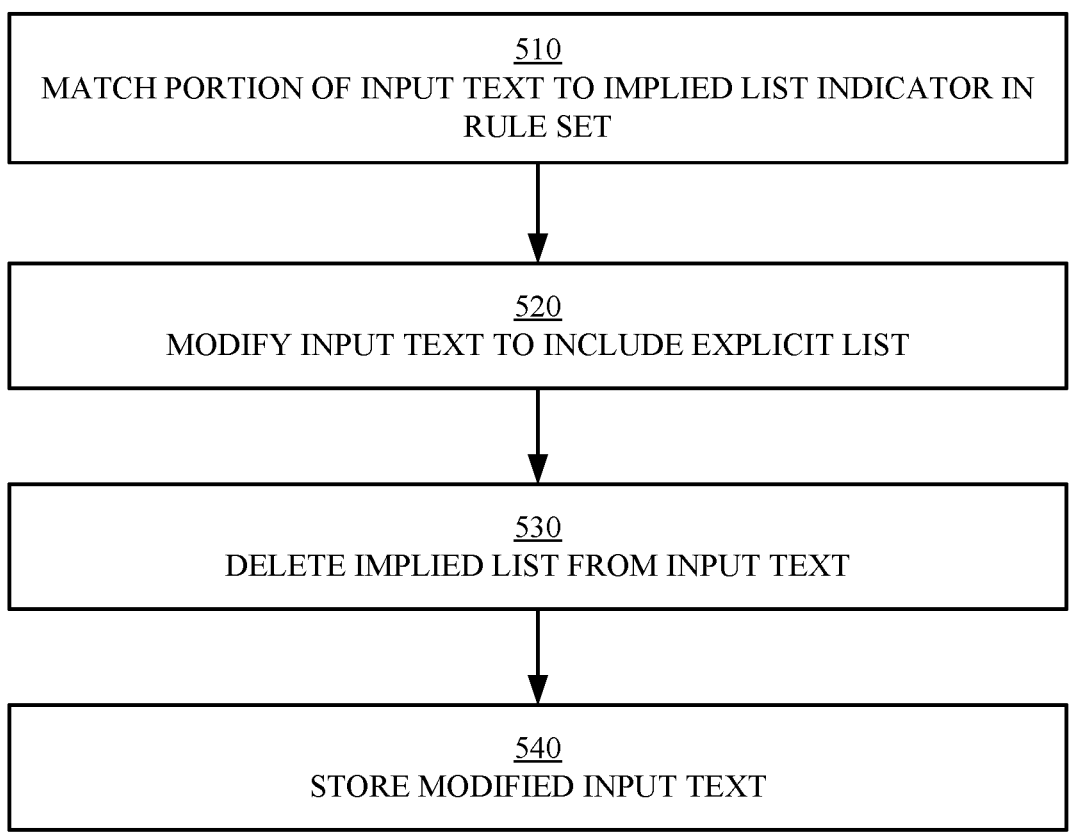
FIG. 5 illustrates an example method for manipulating text to include an implied list in accordance with some embodiments of the present disclosure.

Referring now to FIG. 5, illustrated is an example method 500 for manipulating a set of text to include an implied list in accordance with some embodiments of the present disclosure. According to various embodiments, the method 500 can be executed by one or more processors (e.g., processor 126 of FIG. 1 or 214 of FIG. 2) according to a set of instructions (e.g., list manipulation instructions 138 of FIG. 1 or replacement instructions 236 of FIG. 2). In some embodiments, the method 500 is a submethod of operation 480 of FIG. 4.

The method 500 can begin with matching an implied list indicator to a portion of input text. The implied list indicator can be stored in a list modification rule set according to various embodiments (e.g., the list modification rule set retrieved in operation 470 of FIG. 4). Thus, the list modification rule set, and therefore one or more implied list indicators contained in the list modification rule set, can be relevant to a specific content domain. For example, an implied list indicator contained in a rule set corresponding to a domain of "lung cancer" can be "non-small cell lung cancer" or "NSCLC." Although the appearance of "non-small cell lung cancer" or "NSCLC" in a portion of text does not explicitly indicate a list (i.e., there are no conjunctions, prefix modifiers, and/or suffix modifiers that indicate a list), NSCLC can nonetheless comprise squamous, adenocarcinoma, or large cell lung cancers. Thus, although NSCLC does not grammatically indicate a list, the meaning of NSCLC is associated with a list of particular types of lung cancer.

In operation 520, the input text is modified according to the rule set for the identified implied list indicator. In the aforementioned example regarding NSCLC, the phrase "non-small cell lung cancer" or "NSCLC" is appended with the phrase "non-small cell lung cancer, squamous lung cancer, adenocarcinoma lung cancer, and large cell lung cancer." In operation 530, the implied list indicator text can be deleted from the input text.

In operation 540, the modified input text can be stored. The modified input text can be stored in a computer readable storage medium of a remote device (e.g., memory 108 of remote device 102 of FIG. 1), a host device (e.g., memory 128 of host device 122 of FIG. 1) or a different device accessible via a network (e.g., network 150 of FIG. 1). In some embodiments, the modified input text can be output to a user interface.

Thus, as can be seen, the method 500 demonstrates an example method for identifying a hidden or implied list and manipulating the hidden or implied list to explicitly convey the list in a format suitable for Q&A systems.

Figure 6:
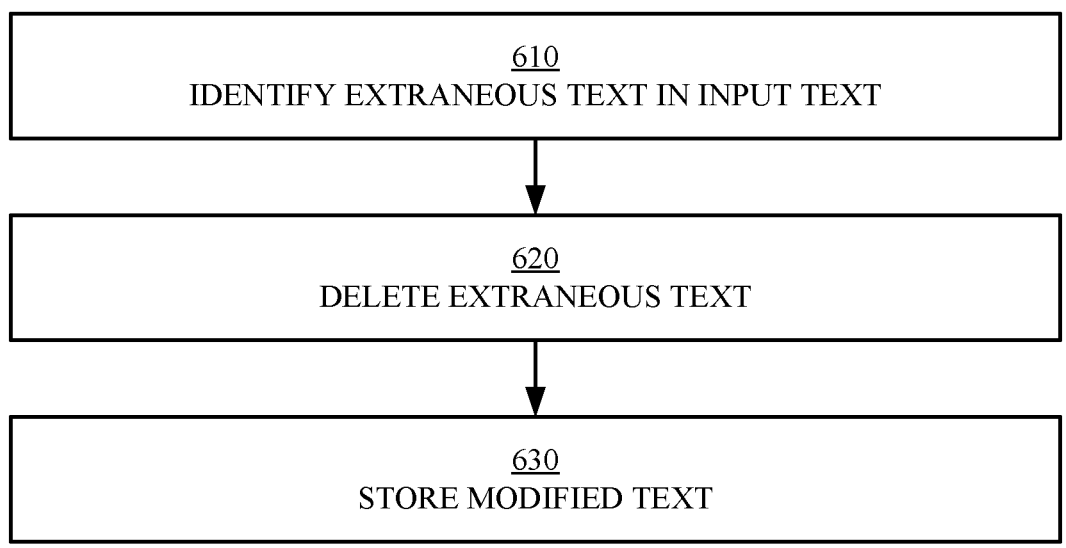
FIG. 6 illustrates an example method for removing extraneous text in accordance with some embodiments of the present disclosure.

Referring now to FIG. 6, shown is an example method 600 of removing extraneous text in accordance with some embodiments of the present disclosure. According to various embodiments, the method 600 can be executed by one or more processors (e.g., processor 126 of FIG. 1 or 214 of FIG. 2) according to a set of instructions (e.g., list manipulation instructions 138 of FIG. 1 or contraction instructions 234 of FIG. 2). In some embodiments, the method 600 is a submethod of operation 480 of FIG. 4.

The method 600 can begin with operation 610 in which extraneous text is identified in a set of input text based on the list modification rule set (e.g., the list modification rule set retrieved in operation 470 of FIG. 4). An example of extraneous text could be "breast cancer" in the statement "previous hormonal breast cancer therapy patients are excluded from this study." If the statement is compared against a dataset containing breast cancer patients, then the term "breast cancer" in the statement is redundant and could inhibit accurately scoring patient profiles.

In operation 620, the extraneous text can be removed. In the above example, the statement could be modified as follows: "previous hormonal therapy patients are excluded from this study."

In operation 630, the modified text can be stored. The modified text can be stored in a computer readable storage medium of a remote device (e.g., memory 108 of remote device 102 of FIG. 1), a host device (e.g., memory 128 of host device 122 of FIG. 1) or a different device accessible via a network (e.g., network 150 of FIG. 1). In some embodiments, the modified text can be output to a user interface.

Thus, the method 600 illustrates an example method for removing extraneous text from content to place the content in a format conducive to Q&A systems. The method can include identifying extraneous text according to a list modification rule set, deleting the extraneous text, and storing the modified text.

Figure 7:
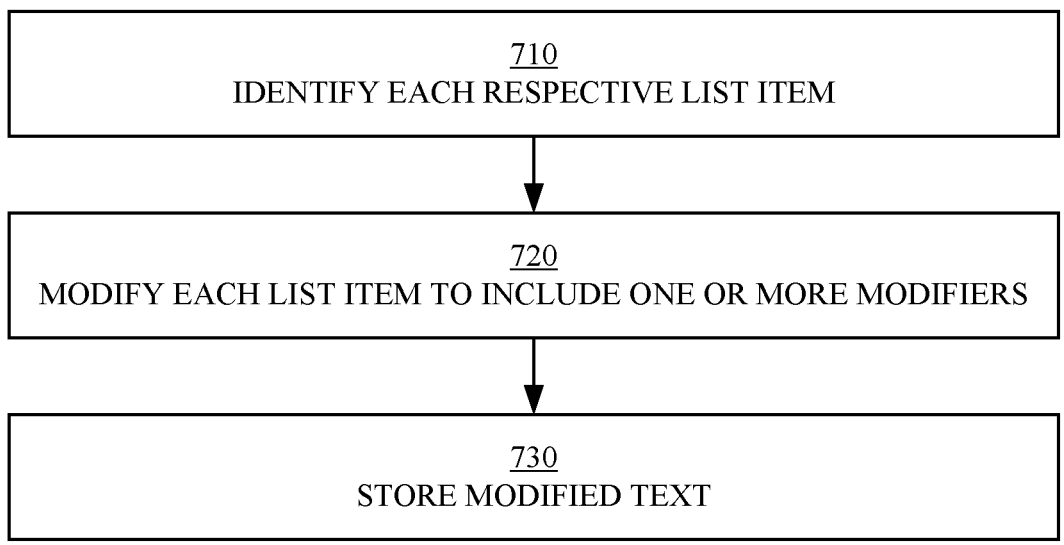
FIG. 7 illustrates an example method for expanding a list in accordance with some embodiments of the present disclosure.

Referring now to FIG. 7, shown is an example method 700 for expanding a list in accordance with some embodiments of the present disclosure. According to various embodiments, the method 700 can be executed by one or more processors (e.g., processor 126 of FIG. 1 or 214 of FIG. 2) according to a set of instructions (e.g., list manipulation instructions 138 of FIG. 1 or expansion instructions 232 of FIG. 2). In some embodiments, the method 700 is a submethod of operation 480 of FIG. 4.

The method 700 can begin with operation 710 in which two or more respective list items are identified. Respective list items can be identified by the presence of conjunctions such as the words "and," "or" and/or punctuation marks such as commas and dashes. Operation 710 can use conditional logic to define each respective list item. For example, the use of a comma can indicate each list item is a discreet entity represented in a phrase or sentence. In contrast, a dash can indicate that numerous respective list items can be implied though not explicitly stated between a lower bound and an upper bound as indicated by adjacent text to the left and right, respectively, of the dash. For example, the phrase "stage I, II, and III cancer" contains three discreet textual elements for each item in the list, as indicated by the commas. In contrast, the phrase "stage I-III cancer" contains two discreet textual elements but implies three discreet list items as indicated by the dash between a lower bound to the left of the dash (i.e., "I") and an upper bound to the right of the dash (i.e., "III").

In operation 720, one or more respective list items can be modified based on prefix and/or suffix modifiers. Operation 720 can append a prefix modifier, or a suffix modifier, or both a prefix modifier and a suffix modifier adjacent to each list item. For example, the input text "stage I, II, and III cancer" could be modified to "stage I cancer, stage II cancer, and stage III cancer."

Although the previous example demonstrates the use of both prefix and suffix modifiers, some embodiments allow for only prefix modifiers or only suffix modifiers to be appended to each list item. The list modification rule set (e.g., the list modification rule set retrieved in operation 470 of FIG. 4) can define how to apply prefix modifiers and/or suffix modifiers to list items.

In operation 730, the modified text can be stored. The modified text can be stored in a computer readable storage medium of a remote device (e.g., memory 108 of remote device 102 of FIG. 1), a host device (e.g., memory 128 of host device 122 of FIG. 1) or a different device accessible via a network (e.g., network 150 of FIG. 1). In some embodiments, the modified text can be output to a user interface.

Thus, the method 700 illustrates an example method for expanding a list using prefix modifiers and/or suffix modifiers. The method can comprise identifying each list item, modifying one or more list items with a prefix modifier, a suffix modifier, or both a prefix modifier and a suffix modifier, and storing the modified text.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
receiving an input text comprising a plurality of lists associated with at least one clinical trial and including a first list indicating various stages of cancer, wherein the first list comprises a first list item, a first comma, a second list item, a second comma, and a third list item;
segmenting the input text into tokens;
annotating the tokens for conjunctions;
annotating the tokens for prefix modifiers and suffix modifiers;
modifying the plurality of lists to generate modified input text, wherein the modified input text expands the first list to explicitly state each respective list item by:
appending a suffix modifier to the first list item;
appending a prefix modifier and the suffix modifier to the second list item; and
appending the prefix modifier to the third list item;
storing the modified input text in a database of clinical trials, wherein the modified input text includes the first list item appended with the suffix modifier, the second list item appended with the prefix modifier and the suffix modifier, and the third list item appended with the prefix modifier;
matching the modified input text to one or more patient profiles in a database of patient profiles by matching stages of cancer associated with the patient profiles to one selected from a group consisting of: the first list item appended with the suffix modifier, the second list item appended with the prefix modifier and the suffix modifier, and the third list item appended with the prefix modifier;
scoring respective matches; and
outputting scored patient profiles to a user interface, wherein patient profiles having a score above a threshold are identified as eligible for the at least one clinical trial and patient profiles having a score below the threshold are identified as not eligible for the at least one clinical trial.

2. The method of claim 1, wherein annotating tokens for parts of speech further comprises:
identifying respective lists of the plurality of lists based on respective tokens annotated as conjunctions;
identifying respective list items based on respective tokens annotated as conjunctions by:
identifying a first discrete list item based on the first discrete list item being located adjacent to a first token annotated as a comma; and
identifying a first implied list item based on a second token annotated as a dash located between a first number and a second number.

3. The method of claim 1, wherein a conjunction is selected from the group consisting of: a respective word from a set of conjunction words, a comma, and a dash.

4. The method of claim 1, further comprising:
annotating a lemma form to respective portions of the input text containing any one of a subset of terms related to the lemma form, wherein the lemma form is associated with a trigger, wherein annotating the lemma form further comprises:
identifying a scope associated with the trigger, wherein the scope comprises a term associated with any one of the subset of terms related to the lemma form, wherein the scope limits a meaning of the trigger.

5. The method of claim 1, further comprising:
annotating at least a portion of the input text for domain specific content.

6. The method of claim 1, wherein modifying the plurality of lists further comprises:
matching a portion of the input text to an implied list indicator, wherein the implied list indicator is associated with a first explicit list;
replacing, in a second list of the plurality of lists, the implied list indicator with the first explicit list by:
appending the first explicit list to the input text at a location containing the implied list indicator, wherein the first explicit list comprises a plurality of list items; and
deleting the implied list indicator from the input text.

7. The method of claim 1, wherein modifying the plurality of lists further comprises:
identifying extraneous text of the input text; and
deleting extraneous text from the input text.

8. A system comprising:
a processor; and
a computer-readable storage medium storing program instructions which, when executed by the processor, cause the processor to perform a method comprising:
receiving an input text comprising a plurality of lists associated with at least one clinical trial and including a first list indicating various stages of cancer, wherein the first list comprises a first list item, a first comma, a second list item, a second comma, and a third list item;
segmenting the input text into tokens;
annotating the tokens for conjunctions;
annotating the tokens for prefix modifiers and suffix modifiers;
modifying the plurality of lists to generate modified input text, wherein the modified input text expands the first list to explicitly state each respective list item by:
appending a suffix modifier to the first list item;
appending a prefix modifier and the suffix modifier to the second list item; and
appending the prefix modifier to the third list item;
storing the modified input text in a database of clinical trials, wherein the modified input text includes the first list item appended with the suffix modifier, the second list item appended with the prefix modifier and the suffix modifier, and the third list item appended with the prefix modifier;
matching the modified input text to one or more patient profiles in a database of patient profiles by matching stages of cancer associated with the patient profiles to one selected from a group consisting of: the first list item appended with the suffix modifier, the second list item appended with the prefix modifier and the suffix modifier, and the third list item appended with the prefix modifier;
scoring respective matches; and
outputting scored patient profiles to a user interface, wherein patient profiles having a score above a threshold are identified as eligible for the at least one clinical trial and patient profiles having a score below the threshold are identified as not eligible for the at least one clinical trial.

9. The system of claim 8, wherein annotating tokens for parts of speech further comprises:
identifying respective lists of the plurality of lists based on respective tokens annotated as conjunctions;
identifying respective list items based on respective tokens annotated as conjunctions by:

identifying a first discrete list item based on the first discrete list item being located adjacent to a first token annotated as a comma; and identifying a first implied list item based on a second token annotated as a dash located between a first number and a second number.

10. The system of claim 8, wherein a conjunction is selected from the group consisting of: a respective word from a set of conjunction words, a comma, and a dash.

11. The system of claim 8, the processor configured to perform a method further comprising:

annotating a lemma form to respective portions of the input text containing any one of a subset of terms related to the lemma form, wherein the lemma form is associated with a trigger, wherein annotating the lemma form further comprises:

identifying a scope associated with the trigger, wherein the scope comprises a term associated with any one of the subset of terms related to the lemma form, wherein the scope limits a meaning of the trigger.

12. The system of claim 8, the processor configured to perform a method further comprising:

annotating at least a portion of the input text for domain specific content.

13. The system of claim 8, wherein modifying the plurality of lists further comprises:

matching a portion of the input text to an implied list indicator, wherein the implied list indicator is associated with a first explicit list;

replacing, in a second list of the plurality of lists, the implied list indicator with the first explicit list by:

appending the first explicit list to the input text at a location containing the implied list indicator, wherein the first explicit list comprises a plurality of list items; and deleting the implied list indicator from the input text.

14. The system of claim 8, wherein modifying the plurality of lists further comprises:

identifying extraneous text of the input text; and
deleting extraneous text from the input text.

15. A computer program product comprising a computer readable storage medium having program instructions embodied therewith, wherein the computer readable storage medium is not a transitory signal per se, the program instructions executable by a processor to cause the processor to perform a method comprising:

receiving an input text comprising a plurality of lists associated with at least one clinical trial and including a first list indicating various stages of cancer, wherein the first list comprises a first list item, a first comma, a second list item, a second comma, and a third list item;

segmenting the input text into tokens;

annotating the tokens for conjunctions;

annotating the tokens for prefix modifiers and suffix modifiers;

modifying the plurality of lists to generate modified input text, wherein the modified input text expands the first list to explicitly state each respective list item by:

appending a suffix modifier to the first list item;
appending a prefix modifier and the suffix modifier to the second list item; and
appending the prefix modifier to the third list item;

storing the modified input text in a database of clinical trials, wherein the modified input text includes the first list item appended with the suffix modifier, the second list item appended with the prefix modifier and the suffix modifier, and the third list item appended with the prefix modifier;

matching the modified input text to one or more patient profiles in a database of patient profiles by matching stages of cancer associated with the patient profiles to one selected from a group consisting of: the first list item appended with the suffix modifier, the second list item appended with the prefix modifier and the suffix modifier, and the third list item appended with the prefix modifier;

scoring respective matches; and outputting scored patient profiles to a user interface, wherein patient profiles having a score above a threshold are identified as eligible for the at least one clinical trial and patient profiles having a score below the threshold are identified as not eligible for the at least one clinical trial.

16. The computer program product of claim 15, wherein annotating tokens for parts of speech further comprises:

identifying respective lists of the plurality of lists based on respective tokens annotated as conjunctions;

identifying respective list items based on respective tokens annotated as conjunctions by:

identifying a first discrete list item based on the first discrete list item being located adjacent to a first token annotated as a comma; and identifying a first implied list item based on a second token annotated as a dash located between a first number and a second number.

17. The computer program product of claim 15, wherein a conjunction is selected from the group consisting of: a respective word from a set of conjunction words, a comma, and a dash.

18. The computer program product of claim 15, the processor configured to perform a method further comprising:

annotating a lemma form to respective portions of the input text containing any one of a subset of terms related to the lemma form, wherein the lemma form is associated with a trigger, wherein annotating the lemma form further comprises:

identifying a scope associated with the trigger, wherein the scope comprises a term associated with any one of the subset of terms related to the lemma form, wherein the scope limits a meaning of the trigger.

19. The computer program product of claim 15, the processor configured to perform a method further comprising:

annotating at least a portion of the input text for domain specific content.

20. The computer program product of claim 15, wherein modifying the plurality of lists further comprises:

matching a portion of the input text to an implied list indicator, wherein the implied list indicator is associated with a first explicit list;

replacing, in a second list of the plurality of lists, the implied list indicator with the first explicit list by:

appending the first explicit list to the input text at a location containing the implied list indicator, wherein the first explicit list comprises a plurality of list items; and deleting the implied list indicator from the input text.

* * * * *